(12) United States Patent
Mere

(10) Patent No.: US 10,475,347 B2
(45) Date of Patent: Nov. 12, 2019

(54) METHOD AND DEVICE FOR GENERATING AN OPTIMUM FLIGHT PATH INTENDED TO BE FOLLOWED BY AN AIRCRAFT

(71) Applicant: Airbus Operations S.A.S., Toulouse (FR)

(72) Inventor: Jean-Claude Mere, Verfeil (FR)

(73) Assignee: Airbus Operations S.A.S. (FR)

(*) Notice: Subject to any disclaimer, the term of this patent is extended or adjusted under 35 U.S.C. 154(b) by 157 days.

(21) Appl. No.: 15/708,355

(22) Filed: Sep. 19, 2017

(65) Prior Publication Data
US 2018/0090015 A1 Mar. 29, 2018

(30) Foreign Application Priority Data
Sep. 29, 2016 (FR) ...................................... 16 59319

(51) Int. Cl.
*G08G 5/00* (2006.01)
*G08G 5/04* (2006.01)
(Continued)

(52) U.S. Cl.
CPC .......... *G08G 5/0034* (2013.01); *G01C 21/20* (2013.01); *G05D 1/0005* (2013.01); *G08G 5/006* (2013.01);
(Continued)

(58) Field of Classification Search
CPC .... G08G 5/0034; G08G 5/0021; G08G 5/006; G08G 5/045; G08G 5/0078; G08G 5/0039; G05D 1/0005; G01C 21/20
See application file for complete search history.

(56) References Cited

U.S. PATENT DOCUMENTS 6,173,219 B1 * 1/2001 Deker .................... G01C 21/00
244/76 R
6,317,690 B1 * 11/2001 Gia ........................ G01C 21/00
340/961
(Continued)

FOREIGN PATENT DOCUMENTS

EP 2 463 844 A1 6/2012
FR 2 789 771 A1 8/2000
(Continued)

OTHER PUBLICATIONS

FR 16 59319 Search Report (dated Apr. 20, 2017).

*Primary Examiner* — Michael J Zanelli
(74) *Attorney, Agent, or Firm* — Lerner, David, Littenberg, Krumholz & Mentlik, LLP

(57) ABSTRACT

A device includes a database including data related to obstacles, a first determination module for determining at least one obstacle intercepted by a direct flight path connecting an initial point to the target point, a second determination module for determining at least one lateral extreme apex of at least one intercepted obstacle, an evaluation module for assigning a rating to each section corresponding to a segment between a lateral extreme apex and the initial point, a storage module for storing in a memory the section corresponding to the optimum extreme apex having the best rating, the optimum flight path corresponding to all of the sections stored in the memory, the preceding modules being used iteratively, the device further including a transmission module for transmitting the optimum flight path to a user device.

8 Claims, 5 Drawing Sheets

(51) Int. Cl.
    *G01C 21/20*     (2006.01)
    *G05D 1/00*     (2006.01)

(52) U.S. Cl.
    CPC ......... *G08G 5/0021* (2013.01); *G08G 5/0039* (2013.01); *G08G 5/0078* (2013.01); *G08G 5/045* (2013.01)

(56) References Cited

U.S. PATENT DOCUMENTS

| | | |
|---|---|---|
| 6,424,889 B1 | 7/2002 | Bonhoure et al. |
| 8,825,366 B2 | 9/2014 | Giovannini et al. |
| 2002/0183922 A1 | 12/2002 | Tomasi et al. |
| 2007/0276553 A1 | 11/2007 | Bitar et al. |
| 2010/0145552 A1* | 6/2010 | Herman ............... G08G 5/0034 701/3 |
| 2012/0143505 A1 | 6/2012 | Giovannini et al. |
| 2015/0371544 A1 | 12/2015 | Mere |

FOREIGN PATENT DOCUMENTS

| | | |
|---|---|---|
| FR | 2 868 835 A1 | 10/2005 |
| FR | 2 968 441 A1 | 6/2012 |
| FR | 3 022 625 A1 | 12/2015 |

\* cited by examiner

METHOD AND DEVICE FOR GENERATING AN OPTIMUM FLIGHT PATH INTENDED TO BE FOLLOWED BY AN AIRCRAFT

FIELD OF THE INVENTION

The present invention relates to a method and a device for generating an optimum flight path intended to be followed by an aircraft, in particular a transport aircraft.

The purpose of the present invention is to generate in real time, with the help of onboard means, optimized flight paths which are flyable in constrained dynamic environments, that is to say in environments that are likely to contain objects or obstacles which the aircraft must avoid colliding with. These objects or these obstacles notably correspond to moving objects such as areas of meteorological disturbances, stormy areas for example, or other aircraft.

BACKGROUND OF THE INVENTION

It is known that management of the flight path of an aircraft is generally left under the control of an onboard flight management system. Modification of a flight plan, in particular, is often a complicated procedure, necessitating multiple interactions with systems of the aircraft, the final result of which is not totally optimized. This is notably due, on the one hand, to the difficulties and limitations inherent in the use of published routes and procedures and, on the other hand, to the limitations of the already existing functions for generating non-published flight paths (for example "DIR TO").

The document FR 2 968 441 describes a method and a device making it possible to determine an optimum flight path followed by an aircraft. It proposes an algorithm for generating optimized flight paths in real time, which can be installed onboard an aircraft, which produces flight paths which can be flown in dynamic environments. It depends on a discretization of the space around the aircraft, based on the elements used by the flight management system (FMS, standing for "Flight Management System" in English) and heuristics computed on the basis of the direct distance to the joining point which is the point to be reached by the flight path. It also prioritizes, via the heuristics, the solutions which minimize the heading deviations with respect to the direct flight path of the aircraft to the joining point. However, the algorithm used does not take account of the location, nor of the geometry of the obstacles in order to anticipate the collisions with the environment. It generates new candidate positions in each iteration and checks a posteriori that these positions are admissible with respect to environmental constraints such as the absence of collision between the flight path making it possible to join this new position and the obstacles. The algorithm therefore goes straight to the joining point until it meets an obstacle, then it goes back in order to go around that obstacle by trying other directions. The method of the algorithm has the feature of being rather robust with regard to the different possible configurations but it sometimes results in a long and unacceptable computing time of an onboard function because the absence of anticipation causes, uselessly with regard to the algorithm, the computation of a large number of positions at each step which result in positions that are inadmissible to the following steps.

The solution proposed by the document FR 2 968 441 could be optimized.

BRIEF SUMMARY OF THE INVENTION

Aspects of the present invention may overcome the disadvantage of useless computations.

For this purpose the invention relates to a method for generating an optimum flight path intended to be followed by an aircraft, the said flight path being defined between a current point and a target point.

According to an aspect of the invention, the method comprises the following steps, executed automatically and iteratively:

a/ a first determination step, implemented by a first determination module, consisting of determining at least one obstacle intercepted by a direct flight path connecting an initial point to the target point, the obstacle or obstacles corresponding to data comprised in a database containing data relative to the obstacles, and the said initial point corresponding to the current point in a first iteration, the initial point corresponding to an optimum extreme apex in the iterations following the first iteration;

b/ a second determination step, implemented by a second determination module, consisting of determining at least one lateral extreme apex of at least one intercepted obstacle, on either side of the direct flight path;

c/ an evaluation step, implemented by an evaluation module, consisting of assigning a rating to each section corresponding to a segment between a lateral extreme apex and the initial point, the rating being representative of its ability to meet a fixed objective, the best rating being assigned to the optimum extreme apex;

d/ a first storage step, implemented by a first storage module, consisting of storing in a first memory each lateral extreme apex, with the rating assigned to it as well as a section of flight path between the initial point and the lateral extreme apex;

e/ a second storage step implemented by a second storage module, consisting of storing in a second memory the section corresponding to the optimum extreme apex, the preceding series of steps a/ to e/ being repeated until a section between an optimum extreme apex and the target point does not encounter any obstacle, the optimum flight path then being reconstituted backwards on the basis of the target point and all of the sections stored in the second memory;

the method comprising moreover, after a last iteration:

f/ a transmission step, implemented by a transmission module, consisting of transmitting the optimum flight path to a user device.

Thus, an aspect of the invention takes account of the geometry of the obstacles by determining the extreme lateral apices. The method and the device make it possible to obtain a rapid convergence by depending on the geometry of the obstacles in order to define a variable heuristic (or rating) adapted to the environmental situation, in such a way as to orient the computation algorithm described in the document FR 2 968 441 directly towards the directions which will make it possible to find a solution whilst limiting the number of positions explored.

Advantageously, the second determination step comprises the following sub-steps:

if a lateral extreme apex is directly visible from the initial point, a first determination sub-step, implemented by a first determination sub-module, consisting of determining at least one coordinate of at least one lateral extreme apex directly visible from the initial point, if a lateral extreme apex is hidden from the initial point, a second determination sub-step, implemented by a second determination sub-module, consisting of executing the following sub-steps:

a sub-step of determining at least one obstacle intercepted by an auxiliary flight path connecting the initial point to the hidden extreme lateral point, a sub-step of determining at least one coordinate of at least one lateral extreme apex of at least one intercepted obstacle, on either side of the auxiliary flight path.

According to one feature, the evaluation step consists of determining, for each lateral extreme apex, the sum of a first distance between the current point and the lateral extreme apex and a second distance between the lateral extreme apex and the target point, the rating being inversely proportional to the sum of the first distance and the second distance.

Moreover, the first determination step is preceded by a step of transformation of the obstacles, implemented by a transformation module, consisting of applying an obstacle expansion function to the data relative to the obstacles.

The invention also relates to a device for generating an optimum flight path intended to be followed by an aircraft, the said flight path being defined between a current point and a target point.

According to an embodiment of the invention, the device comprises:

a database comprising data relative to obstacles, a first determination module, configured for determining at least one obstacle intercepted by a direct flight path connecting an initial point to the target point, the obstacle or obstacles corresponding to data comprised in the database, the initial point corresponding to the current point in a first iteration, the initial point corresponding to an optimum extreme apex in the iterations following the first iteration;

a second determination module, configured for determining at least one lateral extreme apex of at least one intercepted obstacle, on either side of the direct flight path;

an evaluation module configured for assigning a rating to each section corresponding to a segment between a lateral extreme apex and the initial point, the rating being representative of its ability to meet a fixed objective, the best rating being assigned to the optimum extreme apex;

a first storage module configured for storing, in a first memory, each lateral extreme apex with the rating assigned to it as well as the section between the initial point and the lateral extreme apex;

a second storage module configured for storing in a second memory the section corresponding to the optimum extreme apex, the preceding modules being configured for being used iteratively until a section between an optimum extreme apex and the target point does not encounter any obstacle, the optimum flight path then being reconstituted backwards on the basis of the target point and all of the sections stored in the second memory;

the device comprising moreover a transmission module configured for transmitting the optimum flight path to a user device.

Advantageously, the second determination module comprises:

a first determination sub-module, configured for determining at least one coordinate of at least one lateral extreme apex directly visible from the initial point, if a lateral extreme apex is directly visible from the initial point;

a second determination sub-module, configured for executing the following sub-steps, if a lateral extreme apex is hidden from the initial point:

a sub-step of determining at least one obstacle intercepted by an auxiliary flight path connecting the initial point to the hidden extreme lateral point, a sub-step of determining at least one coordinate of at least one lateral extreme apex of at least one intercepted obstacle, on either side of the auxiliary flight path.

Moreover the device comprises a transformation module, consisting of applying an obstacle expansion function to the data relative to the obstacles.

The invention also relates to an aircraft, in particular to a transport aircraft, which comprises a device for generating an optimum flight path such as the one described above.

BRIEF DESCRIPTION OF THE DRAWINGS

The invention, with its features and advantages, will become more apparent on reading the description given with reference to the appended drawings in which.

DETAILED DESCRIPTION

The continuation of the description will refer to the abovementioned figures.

Figure 1:
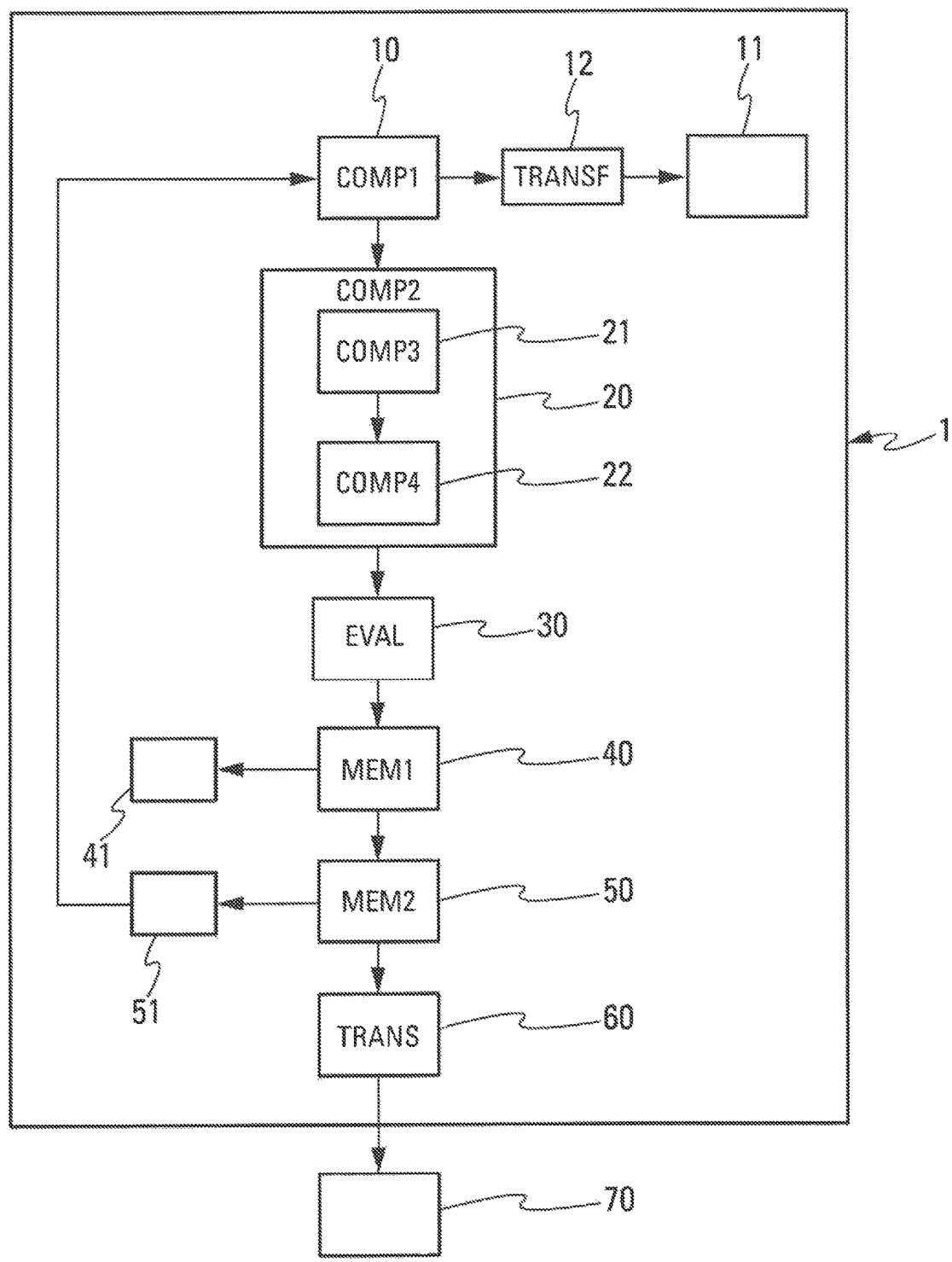
FIG. 1 is a block diagram of an embodiment of the device for generating an optimum flight path intended to be followed by an aircraft.

FIG. 1 shows an embodiment of a device 1 for generating at least an optimum flight path 15 (FIG. 8) intended to be followed by an aircraft (AC).

Figure 2:
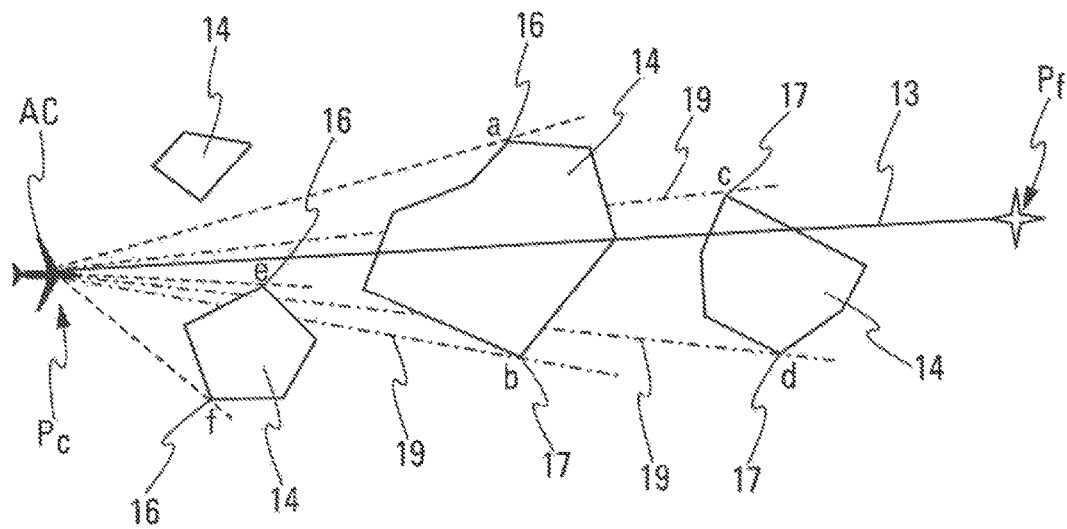
FIG. 2 is a diagrammatic representation of the determination of the lateral extreme apices from the current point.

The optimum flight path 15 is defined between a current point Pc and a target point Pf (FIG. 2).

It comprises a lateral flight path and a vertical flight path.

The current point Pc corresponds to the current position of the aircraft AC starting from which the optimum flight path 15 is determined. The target point Pf corresponds to the final position of the optimum flight path 15.

The said device (FIG. 1) comprises a database 11 comprising data relative to obstacles 14.

The data relative to obstacles 14 correspond to a set of data comprising sets of points representative of obstacles. Each obstacle 14 is defined by a set of points in space. In general, the set of points for an obstacle 14 forms a polyhedron. A polyhedron forming an obstacle 14 has sides separated by segments. The points where at least two segments join correspond to apices of the polyhedron in three dimensions.

The data relative to obstacles 14 can be of several types:
terrain data, representing fixed constraints;
meteorological data which can come from the meteorological monitoring onboard the aircraft or which can be received by the intermediary of a usual data transmission link; and
data relative to surrounding aircraft, which contains the flight plans and predictions of aircraft identified inside a given perimeter.

The said device 1 also comprises a determination module COMP1 10 ("COMP1" standing to "computation module" in English), a determination module COMP2 20, an evaluation module EVAL 30 ("EVAL" standing for "evaluation module" in English), a storage module MEM1 40 ("MEM" standing for "memorization module" in English) and a storage module MEM2 50.

The modules 10, 20 and 30 in connection with the modules 40 and 50 implement an iterative processing as described below.

Figure 4:
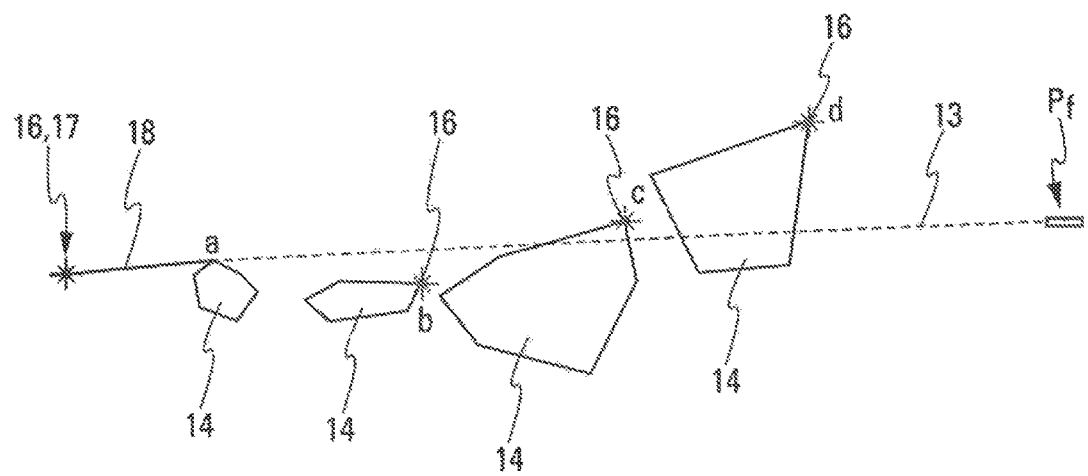
FIG. 4 is a diagrammatic representation of the determination of the obstacles intercepted by the direct flight path from the initial point.
Figure 5:
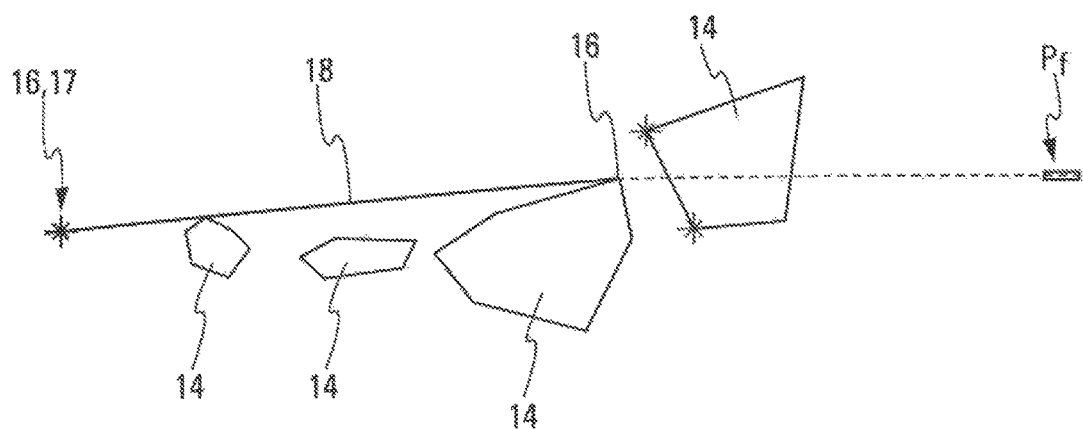
FIG. 5 is a diagrammatic representation of the determination of the obstacles intercepted by the direct flight path from a directly visible lateral extreme apex.
Figure 6:
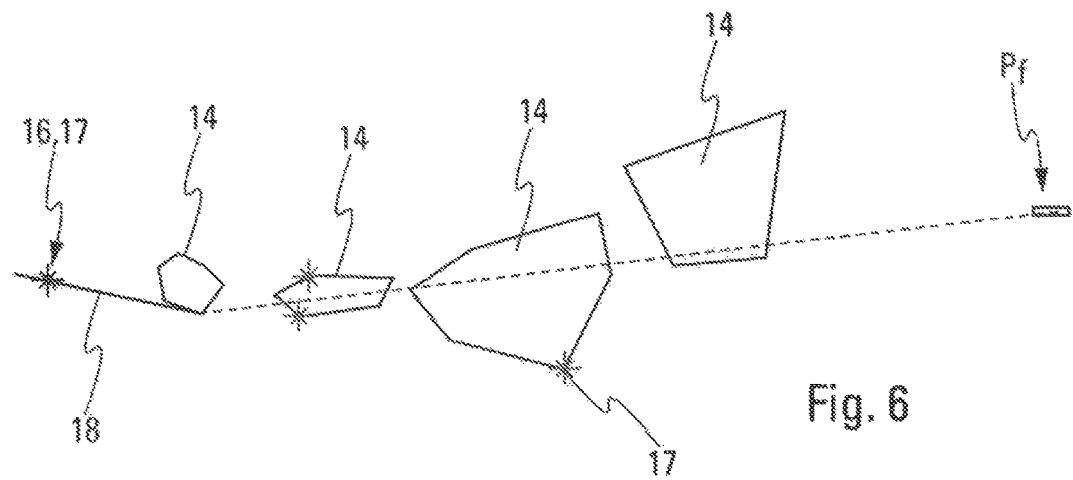
FIG. 6 is a diagrammatic representation of the determination of a lateral extreme hidden from the initial point.
Figure 7:
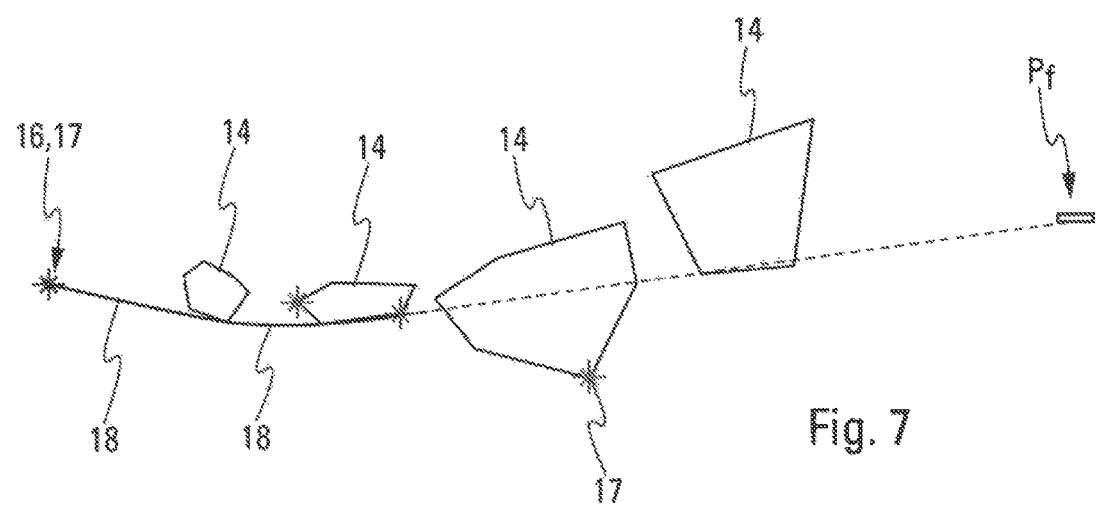
FIG. 7 is a diagrammatic representation of the determination of the direct flight path between a hidden lateral extreme and the target point.

The determination module 10 is configured for determining at least one obstacle 14 intercepted by a direct flight path 13 connecting an initial point to the target point Pf (FIG. 4). A direct flight path 13 corresponds to a straight line flight path.

The initial point corresponds to the current point Pc in a first iteration. The initial point corresponds to an optimum extreme apex in the iterations following the first iteration. An optimum extreme apex is defined below.

Le determination module 20 is configured for determining from among the apices of the obstacle 14 (polyhedron) at least an apex called an extreme lateral apex 16 and 17 of at least one obstacle 14 intercepted on either side of the direct flight path 13 (FIG. 2).

An extreme lateral apex 16 and 17 corresponds to the apex of an obstacle 14 which can be connected by a straight line to the initial point, the straight line intersecting the said obstacle 14 only at the apex 16, 17.

The evaluation module 30 is configured for assigning a rating to each section 18 corresponding to a segment between an extreme lateral apex 16 and the initial point. The rating is representative of the capability of the section 18 of meeting a fixed objective. The best rating is assigned to the optimum extreme apex.

Figure 3:
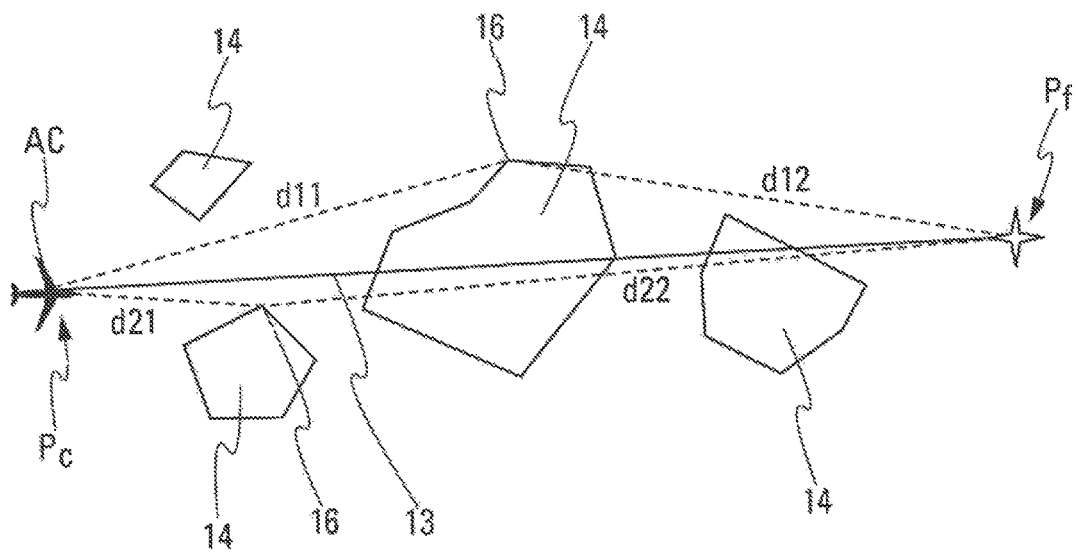
FIG. 3 is a diagrammatic representation of an example of determination of rating assigned to a section of flight path.

According to one embodiment, the rating is determined as follows (FIG. 3). The evaluation module 30 determines, for each extreme apex 16, the sum of a first distance d11 or d21 between the current point Pc and the extreme apex 16 and of a second distance d12 or d22 between the extreme apex 16 and the target point Pf. The assigned rating is inversely proportional to the sum of the first distance d11 (or d21 respectively) and the second distance d12 (or d22 respectively). The fixed objective is thus defined so that the lower the sum is, the better is the rating.

The first storage module 40 is configured for storing in a first memory 41 each visible extreme lateral apex 16, with the rating which is assigned to it as well as the section 18 defined between the initial point and that extreme apex 16.

The second storage module 50 is configured for storing in a second memory 51 the section 18 defined between the initial point and the optimum extreme apex.

The preceding modules are configured for being used iteratively until a section 18 between an optimum extreme apex and the target point Pf does not encounter any obstacle 14.

The optimum flight path 15 is reconstituted by a module for backward computation from the target point Pf and the set of sections 18 stored in the second memory 51 back to the current point Pc.

The device 1 comprises, moreover, a transmission module 60 configured for transmitting the optimum flight path 15 to a user device 70. For example, the user device comprises an FMS system.

According to one embodiment, the determination module 20 comprises a sub-determination module COMP3 21 and a sub-determination module COMP4 22.

The sub-determination module 21 is configured for determining at least one coordinate of at least one lateral extreme apex 16 directly visible from the initial point, if a lateral extreme apex 16 is directly visible from the initial point.

A lateral extreme apex 16 is directly visible if the segment which joins the initial point to the lateral extreme apex 16 does not intersect any obstacle 14 between the initial point and the said lateral extreme apex 16.

In the example shown in FIG. 2, the initial point corresponds to the current point Pc. But, the initial point can correspond to an optimum extreme apex 16. In FIG. 2, the only lateral extreme apex directly visible corresponds to the reference a. In the example shown in FIG. 4, the initial point corresponds to an optimum extreme apex 16. The lateral extreme apices directly visible from the said lateral extreme apex 16 correspond to the references c and d.

The sub-determination module 22 is configured for executing the following sub-steps, if a lateral extreme apex 17 is hidden from the current point:
a sub-determination step of at least one obstacle 14 intercepted by an auxiliary flight path 19 connecting the initial point to the hidden lateral extreme point 17,
a sub-determination step of at least one coordinate of at least one lateral extreme apex 16 of at least one obstacle 14 intercepted, on either side of the auxiliary flight path 19.

A lateral extreme apex 17 is hidden if the segment 19 which joins the initial point to the lateral extreme apex 17 intersects at least one obstacle 14 other than the obstacle 14 comprising the lateral extreme apex 17.

In the example shown in FIG. 2, the lateral extreme apices hidden from the current position Pc correspond to the references b, c and d. The lateral extreme apices identified by the sub-determination module 22 on either side of the auxiliary flight path 19 connecting the initial point to the hidden extreme lateral point corresponding to the reference b, directly visible from the current point Pc, correspond to the references e and f.

The optimum flight path 15 obtained by the device 1 may not be flyable because, for example, it does not comply with the radii of curvature of a flight path of an aircraft AC. It cannot be used as a flight plan to feed an FMS system either because, for example, being based on the polyhedral apices representing the obstacles 14 to be avoided, the flight path that the FMS system could construct could interfere with the obstacles 14.

For this purpose, at least two variant embodiments making it possible to obtain a flyable flight path are described below.

According to one feature, the said device comprises a transformation module 12, consisting of applying an obstacle 14 expansion function to the data relative to the obstacles 14. The transformation module 12 makes it possible, for example, to expand the polyhedrons homothetically. By this expansion, the polyhedrons have dimensions which increase without the shape of the polyhedron being modified.

This feature makes it possible to provide the margin necessary for the computation of the flight path by the FMS system which would use the computed flight path as a reference flight plan.

In a preferred embodiment, the device 1 for generating an optimum flight path intended to be followed by an aircraft AC, such as described above, is used by implementing the following method.

Figure 9:
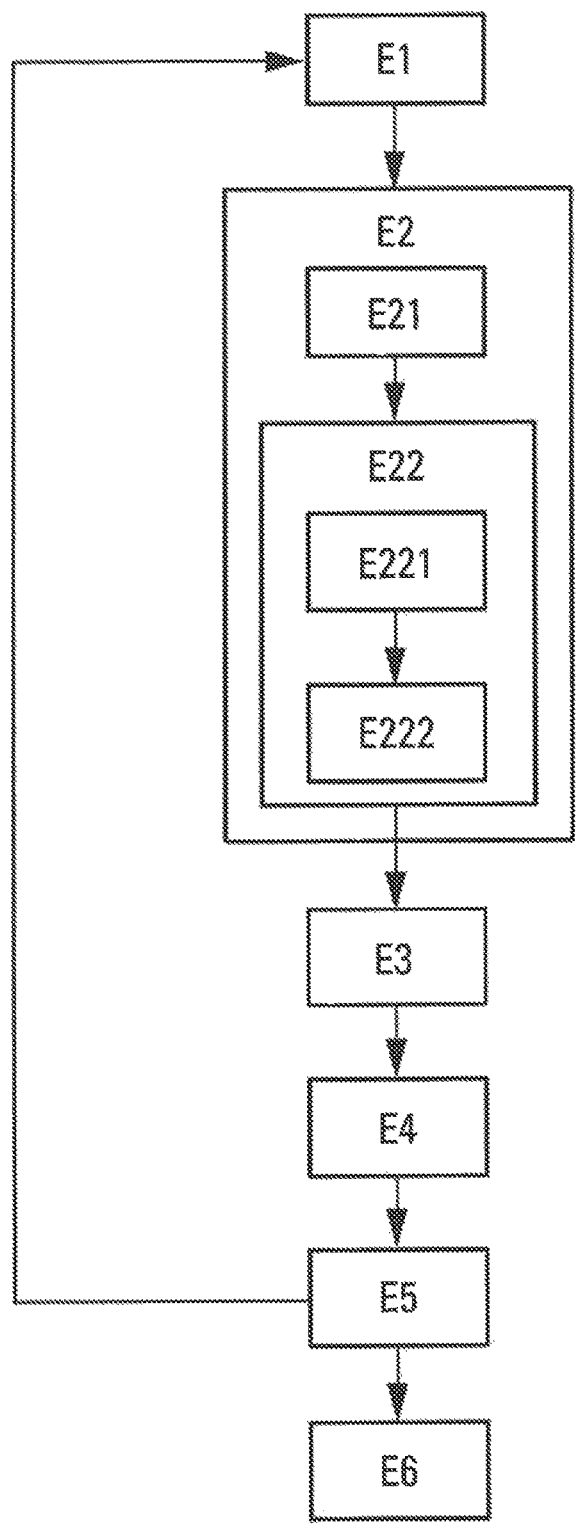
FIG. 9 shows a block diagram of the method for generating an optimum flight path intended to be followed by an aircraft.

The said method comprises the following steps, executed automatically and iteratively (FIG. 9):

a/ a first determination step E1, implemented by the determination module 10, consisting of determining at least one obstacle 14 intercepted by a direct flight path 13 joining an initial point to the target point Pf, the initial point corresponding to the current point Pc in a first iteration (FIG. 2), the initial point corresponding to an optimum extreme apex 16 in the iterations following the first iteration (FIGS. 4, 5, 6, 7);

b/ a second determination step E2, implemented by the determination module 20, consisting of determining at least one lateral extreme apex 16 and 17 of at least one intercepted obstacle 14, on either side of the direct flight path 13 (FIGS. 2 and 4);

c/ an evaluation step E3, implemented by the evaluation module 30, consisting of assigning a rating to each section 18 corresponding to a segment between a lateral extreme apex 16 and the initial point. The rating is representative of its ability to meet a fixed objective. The best rating is assigned to the optimum extreme apex;

d/ a first storage step E3, implemented by the storage module 40, consisting of storing in a memory 41 each extreme apex 16, with the rating which is assigned to it as well as a section 18 of flight path between the initial point and the lateral extreme apex;

e/ a second storage step E4, implemented by the storage module 50, consisting of storing in a memory 51 the section 18 corresponding to the optimum extreme apex.

Figure 8:
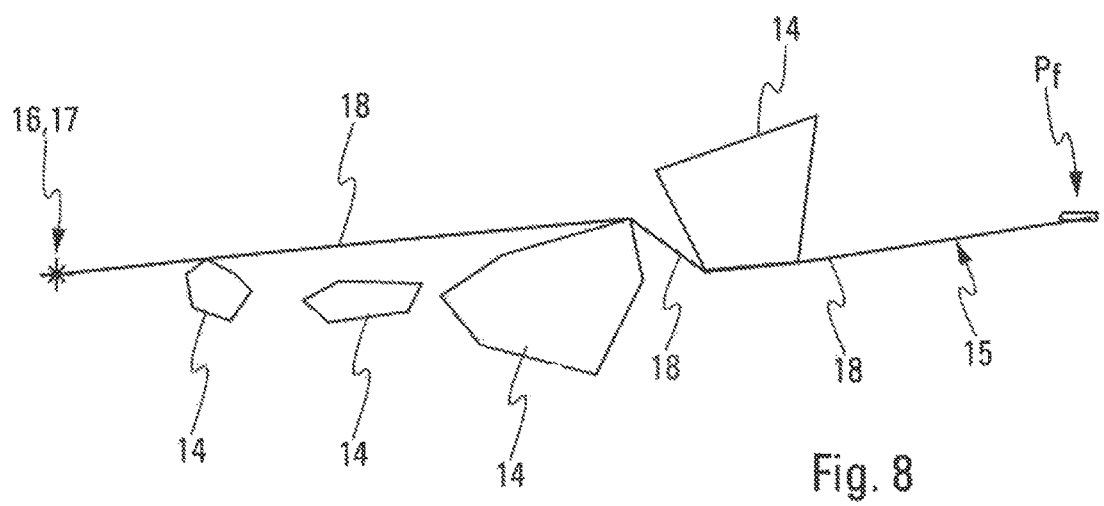
FIG. 8 is a diagrammatic representation of an optimum flight path determined by the method.

The preceding series of steps a/ á e/ is repeated until a section 18 between an optimum extreme apex and the target point Pf does not encounter any obstacle 14. The optimum flight path 15 is then reconstituted backwards from the target point Pf and the set of sections 18 stored in the memory 51 (FIG. 8).

The method comprises moreover, after a last iteration f/, a transmission step E5, implemented by the transmission module 60, consisting of transmitting the optimum flight path 15 to a user device 70.

According to one embodiment, the second determination step E2 comprises the following sub-steps:

if a lateral extreme apex 16 is directly visible from the initial point, the method comprises a first sub-determination step E21, implemented by the first sub-determination module 21, consisting of determining at least one coordinate of at least one lateral extreme apex 16 directly visible from the initial point, if a lateral extreme apex 17 is hidden from the initial point, the method comprises a second sub-determination step E22, implemented by a sub-determination module 22, consisting of executing the following sub-steps:

a sub-determination step E221 of at least one obstacle 14 intercepted by an auxiliary flight path 19 connecting the initial point to the hidden lateral extreme point 17, a sub-determination step E222 of at least one coordinate of at least one lateral extreme apex of at least one intercepted obstacle 14, on either side of the auxiliary flight path 19.

Advantageously, the evaluation step E3 consists of determining, for each extreme apex 16, the sum of a first distance d11 between the current point Pc and the extreme apex 16 and a second distance d12 between the extreme apex 16 and the target point Pf. The determined rating is inversely proportional to the sum of the first distance d11 and the second distance d12. The fixed objective corresponds to the fact that the lower the sum is, the better is the rating.

Moreover, the first determination step E1 is preceded by a step E10 of transformation of the obstacles, implemented by the transformation module 12, consisting of applying an obstacle expansion function 14 to the data relative to the obstacles 14.

The method and the device 1 make it possible to obtain a fast convergence by being based on the geometry of the obstacles in order to define, in each step, a heuristic (or rating) adapted to the environmental situation in such away as to orient the computation algorithm directly towards the directions which will make it possible to find a solution whilst limiting the number of positions explored.

In order to do this, the apices 16 of the polyhedrons defining the obstacles 14 to be avoided are identified in order to give the shortest succession of the directions to follow in order to go around the obstacles 14 with respect to the direct flight path 13. A pseudo-flight path 15 is then obtained in the form of broken lines 18. This pseudo-flight path 15 takes into account the entirety of the operational requirements associated with the use of aircraft AC without having recourse to a complete discretization of the spatial references between the current point Pc and the final point Pf of the flight path to be generated, which makes it possible to compute the flight path much faster. However, this flight path if not always flyable as it is. That is why it is secondly possible to apply the method of the document FR 2 968 441 in order to obtain a flyable flight path by adapting the ratings assigned in each iteration giving priority to heading deviations close to that of each section 18 determined in the present invention in order to converge rapidly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating an optimum flight path intended to be followed by an aircraft, the flight path being defined between a current point and a target point, the method comprising the following steps, executed automatically and iteratively by one or more processors:

a) a first determination step, implemented by one of the one or more processors, including determining at least one obstacle intercepted by a direct flight path connecting an initial point to the target point, the obstacle or obstacles corresponding to data comprised in a database containing data related to the obstacles, and the initial point corresponding to the current point in a first iteration, the initial point corresponding to an optimum extreme apex in the iterations following the first iteration;

b) a second determination step, implemented by one of the one or more processors, including determining at least one lateral extreme apex of at least one intercepted obstacle, on either side of the direct flight path;

c) an evaluation step, implemented by one of the one or more processors, including assigning a rating to each section corresponding to a segment between a lateral extreme apex and the initial point, the rating being representative of its ability to meet a fixed objective, the best rating being assigned to the optimum extreme apex;

d) a first storage step, implemented by a first storage module, including storing in a first memory each visible lateral extreme apex, with the rating assigned to it as well as a section of flight path between the initial point and the lateral extreme apex;

e) a second storage step implemented by a second storage module, including storing in a second memory the section corresponding to the optimum extreme apex, the preceding series of steps a) to e) being repeated until a section between an optimum extreme apex and the target point does not encounter any obstacle, the optimum flight path then being reconstituted backwards on the basis of the target point and all of the sections stored in the second memory;

the method further comprising, after a last iteration:

f) a transmission step, implemented by one of the one or more processors, including transmitting the optimum flight path to a user device.

2. The method according to claim 1, wherein the second determination step comprises the following sub-steps:

if a lateral extreme apex is directly visible from the initial point, a first determination sub-step, implemented by one of the one or more processors, including determining at least one coordinate of at least one lateral extreme apex directly visible from the initial point, if a lateral extreme apex is hidden from the initial point, a second determination sub-step, implemented by one of the one or more processors, including executing the following sub-steps:

a sub-step of determining at least one obstacle intercepted by an auxiliary flight path connecting the initial point to the hidden extreme lateral apex, and a sub-step of determining at least one coordinate of at least one lateral extreme apex of at least one intercepted obstacle, on either side of the auxiliary flight path.

3. The method according to claim 1, wherein the evaluation step includes determining, for each lateral extreme apex, the sum of a first distance between the current point and the lateral extreme apex and a second distance between the lateral extreme apex and the target point, the rating being inversely proportional to the sum of the first distance and the second distance.

4. The method according to claim 1, wherein the first determination step is preceded by a step of transformation of the obstacles, implemented by one of the one or more processors, including applying an obstacle expansion function to the data relative to the obstacles.

5. A device for generating an optimum flight path intended to be followed by an aircraft, the flight path being defined between a current point and a target point, the device comprising:

a database comprising data related to obstacles, a first determination processor, configured for determining at least one obstacle intercepted by a direct flight path connecting an initial point to the target point, the obstacle or obstacles corresponding to data comprised in the database, the initial point corresponding to the current point in a first iteration, the initial point corresponding to an optimum extreme apex in the iterations following the first iteration;

a second determination processor, configured for determining at least one visible lateral extreme apex of at least one intercepted obstacle, on either side of the direct flight path;

an evaluation processor configured for assigning a rating to each section corresponding to a segment between a lateral extreme apex and the initial point, the rating being representative of its ability to meet a fixed objective, the best rating being assigned to the optimum extreme apex;

a first storage module configured for storing, in a first memory, each lateral extreme apex with the rating assigned to it as well as the section between the initial point and the lateral extreme apex;

a second storage module configured for storing in a second memory the section corresponding to the optimum extreme apex;

wherein the first and second determination processors, evaluation processor and the first storage module and the second storage module are configured for being used iteratively until a section between an optimum extreme apex and the target point does not encounter any obstacle, the optimum flight path then being reconstituted backwards on the basis of the target point and all of the sections stored in the second memory;

the device further comprising a transmission processor configured for transmitting the optimum flight path to a user device.

6. The device according to claim 5, wherein the second determination processor comprises:

a third determination processor, configured for determining at least one coordinate of at least one lateral extreme apex directly visible from the initial point, if a lateral extreme apex is directly visible from the initial point;

a fourth determination processor, configured for executing the following sub-steps, if a lateral extreme apex is hidden from the initial point:

a sub-step of determining at least one obstacle intercepted by an auxiliary flight path connecting the initial point to the hidden extreme lateral apex, and a sub-step of determining at least one coordinate of at least one lateral extreme apex of at least one intercepted obstacle, on either side of the auxiliary flight path.

7. The device according to claim 5, further comprising a transformation processor, configured for applying an obstacle expansion function to the data relative to the obstacles.

8. An aircraft comprising:

a device for generating an optimum flight path intended to be followed by the aircraft, the flight path being defined between a current point and a target point, the device comprising:

a database comprising data related to obstacles, a first determination processor, configured for determining at least one obstacle intercepted by a direct flight path connecting an initial point to the target point, the obstacle or obstacles corresponding to data comprised in the database, the initial point corresponding to the current point in a first iteration, the initial point corresponding to an optimum extreme apex in the iterations following the first iteration;

a second determination processor, configured for determining at least one visible lateral extreme apex of at least one intercepted obstacle, on either side of the direct flight path;

an evaluation processor configured for assigning a rating to each section corresponding to a segment between a lateral extreme apex and the initial point, the rating being representative of its ability to meet a fixed objective, the best rating being assigned to the optimum extreme apex;

a first storage module configured for storing, in a first memory, each lateral extreme apex with the rating assigned to it as well as the section between the initial point and the lateral extreme apex;

a second storage module configured for storing in a second memory the section corresponding to the optimum extreme apex;

wherein the first and second determination processor, evaluation processor and the first and second storage modules are configured for being used iteratively until a section between an optimum extreme apex and the target point does not encounter any obstacle, the optimum flight path then being reconstituted backwards on the basis of the target point and all of the sections stored in the second memory;

the device further comprising a transmission processor configured for transmitting the optimum flight path to a user device.

* * * * *